United States Patent [19]
Prudence

[11] 3,891,721
[45] June 24, 1975

[54] BLOCK POLYMERS OF STYRENE-BUTADIENE-2-VINYLPYRIDINE

[75] Inventor: Robert T. Prudence, Stow, Ohio

[73] Assignee: The Goodyear Tire & Rubber Company, Akron, Ohio

[22] Filed: Nov. 15, 1973

[21] Appl. No.: 415,870

[52] U.S. Cl. ............................ 260/879; 260/880 B
[51] Int. Cl. .......................... C08d 1/20; C08d 3/06
[58] Field of Search ........................ 260/879, 880 B

[56] References Cited
UNITED STATES PATENTS

| | | | |
|---|---|---|---|
| 3,621,077 | 2/1971 | Donat | 260/880 B |
| 3,639,523 | 2/1972 | Hayler et al. | 260/880 B |
| 3,766,300 | 10/1973 | DeLaMare | 260/879 |

*Primary Examiner*—William F. Hamrock
*Attorney, Agent, or Firm*—F. W. Brunner; J. Y. Clowney; R. A. Thompson

[57] ABSTRACT

Novel polymer compositions of styrene-butadiene-2-vinylpyridine have been discovered which exhibit unusual physical characteristics in the light of the monomer composition. There is also disclosed the method of preparing these unusual block polymers.

6 Claims, No Drawings

BLOCK POLYMERS OF STYRENE-BUTADIENE-2-VINYLPYRIDINE

This invention relates to a novel polymer composition. More particularly, this invention relates to a new styrene-butadiene-2-vinylpyridine block polymer which exhibits unusual tensile strength.

The prior art shows the preparation of many types of what are commonly called block polymers. The prior art has also shown the use of styrene, butadiene and vinyl pyridine as monomers for use in making a variety of block polymers. However, the unique properties possessed by the polymers prepared by this invention have not heretofore been disclosed and having been discovered are now being sought to be patented.

These superior properties can be used in film applications where a polymer of high strength and good clarity can be utilized.

Prior art 2-vinylpyridine-butadiene-2-vinylpyridine block polymers mold poorly and have tensile strengths only a fraction of that of the block polymers of this invention when either molded or cast as films. Prior art styrene-butadiene-styrene block polymers have fair molding properties and tensile strengths in the range of about 3000 psi. Prior art 2-vinylpyridine-styrene-butadiene-styrene-2-vinylpyridine block polymers have poor molding characteristics and exhibited only moderate tensile strengths. Thus, from observation of such prior art block polymers mentioned above and their respective characteristics and tensile properties, it would not be expected that a styrene-butadiene-2-vinylpyridine block polymer such as described by the present invention, whether cast as a film or molded, would give good processing and tensiles over 5200 psi.

Thus, the invention is a composition comprising a triblock polymer composed of a polystyrene block, a polybutadiene block and a poly-2-vinylpyridine block wherein the polystyrene block has a molecular weight of 10,000 to 15,000, the polybutadiene block has a molecular weight of 30,000 to 80,000, the poly-2-vinylpyridine block has a molecular weight of 5,000 to 15,000, and the ultimate tensile of the triblock polymer is at least 5200 psi and the elongation of the triblock polymer is at least 650 percent.

A more narrow range of molecular weights which would be more preferred are polystyrene from about 11,000 to about 13,000, polybutadiene from about 30,000 to about 50,000 and poly-2-vinylpyridine from about 8,000 to about 12,000.

The triblock polymers of this invention are made by contacting the three monomers, styrene, butadiene and 2-vinylpyridine, sequentially with an organolithium catalyst in an inert solvent.

The organolithium catalysts useful in the practice of this invention are any that correspond to the formula R-Li in which R is selected from the group consisting of alkyl, cycloalkyl, aryl, alkaryl, and arylalkyl. Representative of the compounds responding to the formula set forth are isopropyl lithium, tertiary octyl lithium, n-decyl lithium, naphthyl lithium, 4-butylphenyl lithium, methyl lithium, ethyl lithium, butyl lithium, amyl lithium, hexyl lithium, p-tolyllithium, 4-phenylbutyllithium, cyclohexyl lithium, 4-butylcyclohexyllithium, 4-cyclohexylbutyllithium, 2-ethylhexyllithium, allyllithium, phenyllithium and the like.

The amount of organolithium catalyst used in the practice of this invention cannot be specifically set down since the amount of catalyst used depends on desired molecular weight of the polymer. What can be said is that a catalytic amount is necessary for polymerization. As a general rule the molecular weight of the polymer is equal to the grams of polymer formed divided by the moles of organolithium catalyst employed. Thus, one skilled in the art can adjust the catalyst level to get any desired molecular weight polymer.

The polymerization reaction is usually carried out in an inert solvent such as a hydrocarbon, preferably propane, isobutane, pentane, isooctane, cyclopentane, cyclohexane, benzene, toluene or xylene, or a mixture of solvents. This type of polymerization system usually results in what is called a living polymer. By the term "living polymer" is meant that the polymerization has no termination or transfer reactions so that the polymer chains have lithium atoms attached to the chain end even when all the monomer is consumed. If additional monomer is added, the polymerization will continue with the new monomer adding on to the already existing chains until it also is consumed.

The order of monomer addition is important in that the 2-vinyl pyridine has to be the last monomer added in the incremental addition procedure. The styrene must be contacted with the organolithium catalyst first, the butadiene is added and then the 2-vinylpyridine must be added last in order to produce the block polymers of this invention.

The polymerization reactions are usually carried out at temperatures from about 0°C. to about 100°C. The polymerization reaction is preferably carried out between 30°C. and 80°C.

The practice of this invention is further illustrated by reference to the following examples which are intended to be representative rather than restrictive of its scope.

EXPERIMENTAL

The following examples will show the superior tensile properties of the polymers made by this invention compared to prior art type block polymers using the same starting monomers. The examples will also illustrate the unexpectedly large increase in tensile properties of the block polymers made by this invention, i.e. there seems to be a synergistic effect which gives a novel block polymer composition. The 2-vinylpyridine was purified for all the examples as described in Example I.

EXAMPLE I

This comparative example shows the preparation of a block polymer having a polybutadiene block joined on either end by a chemical bond with a poly-2-vinylpyridine block.

A 2-vinylpyridine in benzene solution was passed through a silica gel column under nitrogen pressure. After nitrogen sparging, the solution contained 0.265 grams/milliliter (gm/ml) 2-vinylpyridine.

A premix of 175 gms. of butadiene in 1740 ml. of benzene was passed through a silica gel column under nitrogen pressure. To a polymerization vessel was added 160 ml. of the butadiene solution. After nitrogen sparging of the butadiene solution, the solution contained 9.32 gm. of butadiene. A 0.2 normal (N) 2-butyl lithium (2-BuLi) solution was used to scavenge any impurities in the polymerization mixture. The polymerization was initiated with 0.38 ml. of a 0.44 molar (M) solution of dilithiodiisoprene (Di-Li-I) and the polymerization vessel tumbled end over end in a 60°C. water bath for 3 hours. When all of the butadiene had reacted, the bottle was removed from the bath and allowed to cool to room temperature. After cooling, a benzene solution containing 3.68 gm. of 2-vinylpyridine was added to the polymerization mixture while shaking the vessel. The mixture was allowed to stand for one hour at room temperature after which time the reaction was terminated with one ml. methanol (MeOH) which contained 0.1 gm. of a phenolic type antioxidant. The polymer was dried under reduced pressure at 50°C. for 24 hours.

EXAMPLE II

This comparative example shows the preparation of a poly-2-vinylpyridine-poly-styrene-polybutadiene-polystyrene-poly-2-vinylpyridine block polymer.

A premix of 59 gm. of styrene, 78 gm. of butadiene and 1790 ml. of benzene was passed through a silica column under nitrogen pressure. To a polymerization vessel was added 160 ml. of the premix solution. After nitrogen sparging of the premix solution the polymerization vessel contained 4.46 gm. of styrene and 5.21 gm. of butadiene. A 0.2 N. 2-BuLi solution was used to scavenge any impurities in the premix solution. The premix solution was initiated with 0.26 ml. of a 0.423 M. solution of 1,3-bis(1-lithio-3-methylpentyl) benzene (Di-Li-3) and the vessel tumbled end over end in a 60°C. water bath for 3 hours. Although an organe-red color appeared after approximately one hour, indicating the styryl anion, the polymerization was continued for another 2 hours to insure completion. The polymerization mixture was cooled to room temperature and then a benzene solution containing 0.66 gm. of 2-vinylpyridine was added to the polymerization with vigorous shaking. After 1 hour, the reaction was killed using 1 ml. MeOH containing 0.1 gm. phenolic antioxidant. The polymer was dried initially at room temperature and then dried for 24 hours at 50°C. under reduced pressure to yield 10.14 gm. polymer with DSV (toluene) 1.67 and 2.6 percent gel.

EXAMPLE III

This example shows the preparation of a polystyrene-polybutadiene-poly-2-vinylpyridine block polymer in accordance with the invention.

A premix of 429 gm. of styrene in 2500 ml. of benzene was passed down a silica column under nitrogen pressure. To a polymerization vessel was added 165 ml. of the premix solution. After nitrogen sparging the polymerization vessel contained 22.4 gm. of styrene. Under a blanket of nitrogen, 1.62 ml. (0.1 ml. scavenger) of 1.23 N. second BuLi was added to the premix solution. After sealing and shaking the vessel it was placed in a cold-water bath to moderate the exotherm. After 2 hours in the water bath, the catalyst (polystyrl lithium) was allowed to stand at least 24 hours at room temperature.

A premix of 154 gms. of butadiene in 2740 ml. of benzene was passed down a silica column under nitrogen pressure. To a polymerization vessel was added 165 ml. of the premix solution. After nitrogen sparging, the bottle contained 7.0 gm. of butadiene and required a scavenger of 0.70 ml. of 0.19 N. second BuLi. After the scavenger was added, the premix solution was catalyzed with 16.5 ml. of a 0.0106 N. poly-styrl lithium of molecular weight 12,500. After 50 minutes at 65°C. the polymerization vessel was cooled to room temperature and a benzene solution containing 1.75 gm. of 2-vinylpyridine was added to the polymerization mixture. After one hour at room temperature the reaction was killed with 1 ml. of MeOH containing 0.1 gm. of a phenolic antioxidant. After a preliminary drying at room temperature for 18 hours, the polymer was dried at 50°C. under reduced pressure for 24 hours. Yield was 10.9 gm. DSV (toluene) 0.73 and gel 2.9 percent.

Table 1

In this table the results obtained on the prior art block polymers of Examples I and II are compared with the block polymer of Example III which illustrates this invention. The block polymers made by the invention exhibit much higher tensile properties which are unexpected when compared with tensile properties of the prior art block polymers.

In column 1 is given the molecular weight of poly-2-vinylpyridine, column 2 is the molecular weight of polystyrene, column 3 is the molecular weight of polybutadiene, column 4 is weight percent of the end blocks, column 5 is reaction temperature, column 6 is the polymer percent elongation, column 7 is tensile in pounds per square inch, column 8 is dilute solution viscosity, column 9 is percent gel by weight, and column 10 is how the tensile sample was prepared.

| MW 2VP ×10⁻³ | MW S ×10⁻³ | MW Bd ×10⁻³ | Wt % End Blocks | Rx Temp (°C.) | Elong. % | Tensile psi | DSV | Gel % | Tensile Sample Prep |
|---|---|---|---|---|---|---|---|---|---|
| 2-VP-Bd-2-VP Polymers | | | | | | | | | |
| 11 | — | 56 | 28.2 | 60 | 1140 | 725 | 1.27 | 2.9 | C |
| 15 | — | 56 | 34.8 | 60 | 1380 | 1160 | 1.22 | 2.3 | C |
| 12.5 | — | 43 | 36.7 | 25 | 10 | 216 | 1.39 | 36.0 | A |
| 2-VP-St-Bd-St-2 VP | | | | | | | | | |
| 8 | 15 | 68 | 40.4 | 25 | 1140 | 2450 | 1.76 | 2.9 | C |
| 10 | 15 | 68 | 42.4 | 25 | 1060 | 3250 | 1.87 | 3.0 | C |
| 13 | 15 | 68 | 45.2 | 25 | 740 | 2550 | 1.86 | 2.8 | C |
| 3 | 20 | 48 | 48.9 | 60 | 750 | 2310 | 1.67 | 2.6 | C |
| 6 | 20 | 48 | 52.0 | 60 | 860 | 3123 | 1.77 | 3.4 | C |
| 16 | 17 | 57 | 53.7 | 25 | 250 | 1022 | 1.59 | 3.7 | A |
| | | | | | 490 | 1920 | | | D |
| | | | | | 750 | 2950 | | | C |
| St-Bd-2-VP | | | | | | | | | |
| 15 | 10 | 30 | 45.5 | 65 | 690 | 6100 | 0.60 | 2.8 | C |
| 15 | 10 | 40 | 38.5 | 65 | 710 | 5900 | 0.79 | 2.0 | C |
| 10 | 12.5 | 40 | 36.0 | 65 | 710 | 6700 | 0.73 | 2.9 | C |
| 15 | 10 | 40 | 38.5 | 65 | 710 | 5900 | 0.79 | 2.0 | C |
| 5 | 12.5 | 40 | 30.4 | 65 | 825 | 5270 | 0.93 | 2.5 | D |

Rx - Reaction
A - Mold 300°F./10 min. cooled rapidly under pressure.
B - Mold 350°F./10 min. cooled slowly under pressure.
C - Film cast from benzene.
D - Mold 300°F./20 min. cooled rapidly under pressure.

While certain representative embodiments and details have been shown for the purpose of illustrating the invention, it will be apparent to those skilled in this art that various changes and modifications may be made therein without departing from the spirit or scope of the invention.

What is claimed is:

1. A triblock polymer of polystyrene-polybutadiene-2-vinylpyridine formed by the process of contacting sequentially styrene, butadiene and 2-vinylpyridine with an organolithium catalyst corresponding to the formula R-Li wherein R is selected from the group consisting of alkyl, cycloalkyl, aryl, alkaryl, and aryl alkyl and characterized by the molecular weight of the polystyrene block ranging from about 10,000 to about 15,000, the molecular weight of the polybutadiene block ranging from about 30,000 to about 80,000 and the molecular weight of the poly-2-vinylpyridine block ranging from about 5,000 to about 15,000, and further characterized in that the ultimate tensile of the triblock polymer is at least 5200 psi, displays at least 650 percent elongation and the end blocks of polystyrene and poly-2-vinylpyridine together comprise at least 30 percent by weight of the said triblock polymer molecular weight.

2. A triblock polymer according to claim 1 wherein the polystyrene molecular weight is from about 11,000 to about 13,000, the polybutadiene block molecular weight is from about 30,000 to about 50,000 and the poly-2-vinylpyridine block molecular weight is from about 8,000 to about 12,000.

3. A triblock polymer according to claim 2, wherein the polystyrene block molecular weight is about 12,500, the polybutadiene block molecular weight is about 40,000 and the poly-2-vinylpyridine block molecular weight is about 10,000.

4. A process of preparing triblock polymers of polystyrene-polybutadiene-poly-2-vinylpyridine which comprises contacting styrene with an organolithium catalyst of the formula R-Li, wherein R is selected from the group of alkyl, cycloalkyl, aryl, alkaryl and aryl alkyl, said styrene being in an amount so that 1 the molecular weight of the polystyrene block ranges from about 10,000 to about 15,000, subsequently adding butadiene in an amount so that the molecular weight of the polybutadiene block ranges from about 30,000 to about 80,000 and subsequently adding 2-vinylpyridine in an amount so that the molecular weight of the poly-2-vinylpyridine block ranges from about 5,000 to about 15,000, said triblock being further characterized in that the ultimate tensile of the triblock polymer is at least 5200 psi, displays at least 650 percent elongation and the end blocks of polystyrene and poly-2-vinylpyridine together comprise at least 30 percent by weight of the said triblock polymer molecular weight.

5. A process according to claim 4 wherein the polystyrene block molecular weight is from about 11,000 to about 13,000, the polybutadiene block molecular weight is from about 30,000 to about 50,000 and the poly-2-vinylpyridine block molecular weight is from about 8,000 to about 12,000.

6. The process according to claim 4 wherein the polystyrene block molecular weight is about 12,500, the polybutadiene block molecular weight is about 40,000 and the poly-2-vinylpyridine block molecular weight is about 10,000.

* * * * *